United States Patent

Meyers

[15] 3,703,892
[45] Dec. 9, 1970

[54] DISPOSABLE, RETRACTABLE THERMOMETER JACKET

[72] Inventor: Edward F. Meyers, 790 Boylston Street, Boston, Mass. 02199

[22] Filed: Dec. 9, 1970

[21] Appl. No.: 96,605

[52] U.S. Cl. ............................. 128/2 H, 206/63. 2 R
[51] Int. Cl. ................................................ A61b 5/00
[58] Field of Search ....... 128/2 C, 2 F, 2 H, 2 M, 2 R, 128/2 S, 2 W, 2 Z, 2.1 R, 303 R, 399, 394, 401; 206/63.2 R, DIG. 11; 73/339 R, 374

[56] References Cited

UNITED STATES PATENTS

| | | | |
|---|---|---|---|
| 3,469,685 | 9/1969 | Baermann | 206/63.2 R |
| 3,552,558 | 1/1971 | Poncy | 206/63.2 R |
| 2,677,965 | 5/1954 | Saffir | 73/374 |
| 3,315,525 | 4/1967 | Sieve | 73/374 |
| 3,254,533 | 6/1966 | Tongret | 128/2 H |

Primary Examiner—William E. Kamm
Attorney—Mandeville & Schweitzer

[57] ABSTRACT

A prophylactic device comprising disposable, flexible, stretchable sterile jacket or sheath housed in a small, membrane sealed, tubular plastic or paper cartridge is disclosed herein. The sterile jacket may be very quickly stretched over and removed from a fever thermometer, thereby completely eliminating the need to otherwise conventionally sterilize thermometers or similar probes prior to each use. After its use, the jacket retracts automatically and sanitarily into the cartridge for easy disposal. The new prophylactic device simplifies and greatly reduces the cost of using all types of thermometer probes which require sterilization prior to each use. Large supplies of the cartridges may be packaged and stored for convenience in dispensers. Individual cartridges are small enough to be carried in large numbers in clothing pockets.

8 Claims, 8 Drawing Figures

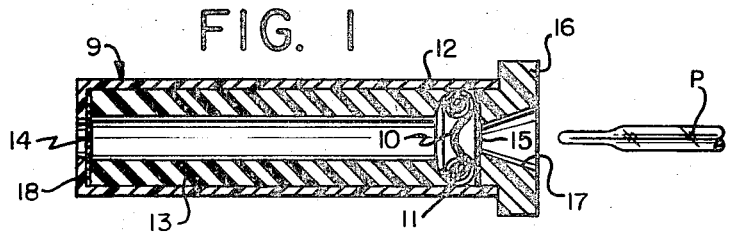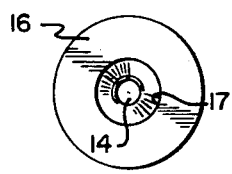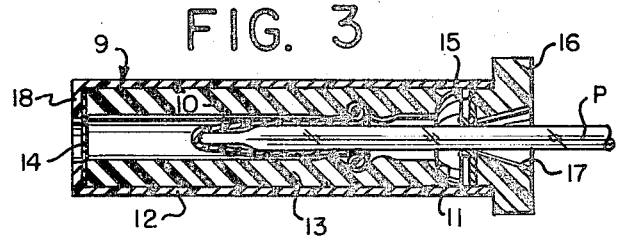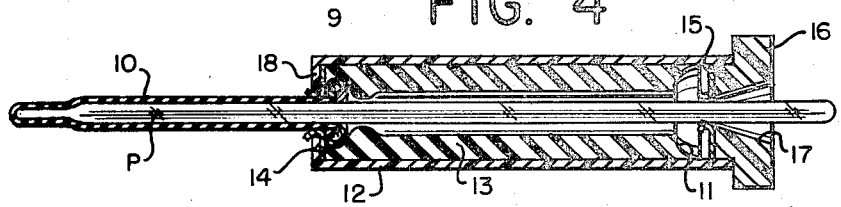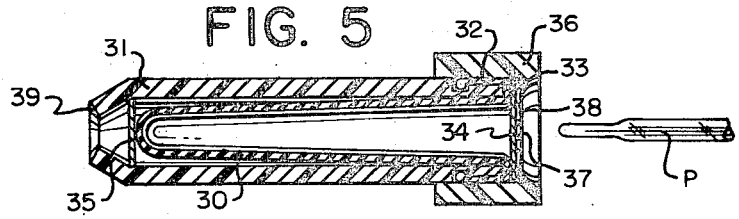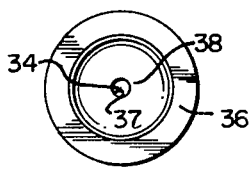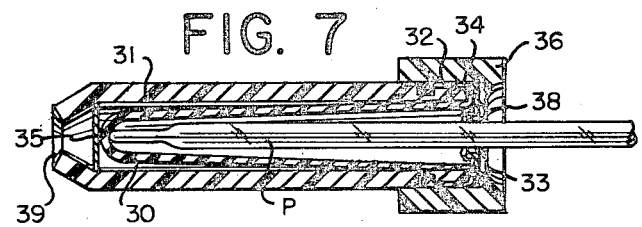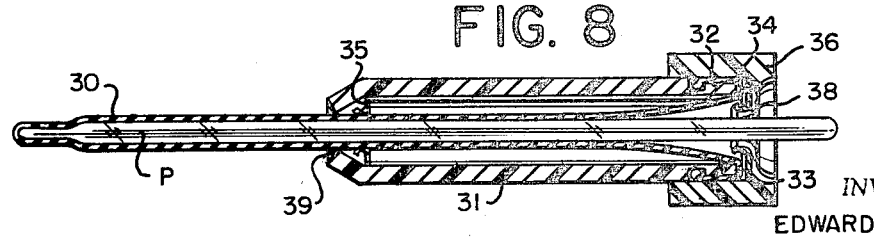

0
DISPOSABLE, RETRACTABLE THERMOMETER JACKET

BACKGROUND OF THE INVENTION

The absolute necessity for sterilization of fever thermometers prior to each use is well understood in the medical arts. The associated costs of handling, distribution and breakage of glass thermometers in hospitals and doctors' offices is enormous. In an effort to reduce these costs, some hospitals have issued a new fever thermometer to each patient, which thermometer stays with him throughout his stay in the hospital. This practice is not wholly satisfactory, since it may lead to re-infection of the patient. Rugged, "unbreakable" electric and electronic thermometers are available, however, they are very expensive, and like glass thermometers, the sensing probes must be sterilized prior to each use.

SUMMARY OF THE PRESENT INVENTION

The present invention is directed to a new and improved, simple, highly economical means of providing sterilization for clinical fever thermometers and medical probes of all types for use in body orifices. Specifically, a very thin, inexpensive, flexible, sterile jacket is housed in a simple, inexpensive tubular container having membrane sealed ends to accommodate conventional gas sterilization of the jacket. In one embodiment of the invention, the rubber jacket is rolled up within the cartridge, which itself is lined with elastomeric material, such as rubber. When a thermometer or a probe is pushed through the membrane seal at one end of the cartridge, the rolled edge of the jacket is slightly compressed between the probe and the inside rubber wall of the cartridge. As the probe is pushed through the cartridge, the jacket unrolls and stretches into close and conforming contact therewith. When the jacketed probe reaches the other end of the cartridge, it is pushed through the seal at that end until the cartridge is at the rear end of the probe. The sterile jacketed forward end of the probe projects from the cartridge and may be safely inserted into the patient.

In the case of an electronic thermometer, the temperature reading is taken before removing the jacketed probe from the patient. With the conventional clinical glass fever thermometer, because of its design, the reading is taken after removal from the patient, at which time the cartridge is grasped and pulled off the thermometer and disposed of, allowing the thermometer to be read as usual. The thin rubber jacket does not interfere with the accuracy of the temperature readings.

Of great importance and in accordance with the invention, as the cartridge is removed from the thermometer, the original unrolling action of the jacket is reversed and it will automatically re-roll itself inside the cartridge where it cannot contaminate anything or anybody. The thermometer or probe remains clean, as will be understood.

In an alternate embodiment of the invention, a very thin, unrolled elastomeric or rubber jacket, larger in diameter than the thermometer or probe, is housed in a simple, inexpensive sterile plastic container with sealed ends. The unrolled rubber jacket is closed at its forward end and is supported in the cartridge at its open, rearward end. When a probe is pushed through the thin seal at the rearward end of the cartridge, the probe is advanced into the jacket until it reaches the closed end. As the probe continues to be pushed, the jacket starts to stretch and to conform to the probe. Thereafter, the seal at the forward end of the cartridge is broken and the probe is pushed forward to provide sufficient projection of the jacketed probe for insertion. The jacket material accommodates stretching to about three times the original length of the jacket. The stretching material accommodates the diameter of the jacket, so that the jacket conforms tightly to the probe. When the cartridge is removed from the probe, the "memory" of the elastomeric jacket will cause it to return to its original dimensions and thus to retract entirely into the cartridge. The rearward end of the cartridge is provided with a flexible plastic cap with an opening which is slightly smaller than the outer diameter of the probe to effect the gripping of the probe when it is forced through the opening. This prevents the stretched elastomeric jacket from ejecting the probe from the cartridge

DESCRIPTION OF DRAWINGS

A more complete understanding of the invention may be had by reference to the following detailed description taken in conjunction with the accompanying drawings, Sheets A and B in which:

FIG. 1 is a longitudinal cross-sectional view of the cartridge and jacket of one embodiment of the invention showing a thermometer or probe about to be inserted.

FIG. 2 is an end elevational view of the cartridge of FIG. 1.

FIG. 3 is a longitudinal cross-sectional view showing the thermometer or probe inserted into the cartridge.

FIG. 4 is a longitudinal cross-sectional view showing the thermometer or probe fully inserted entirely through the cartridge with the jacketed probe projecting and ready for use.

FIG. 5 is a longitudinal cross-sectional view of a cartridge and jacket showing a thermometer or probe about to be inserted.

FIG. 6 is an end elevational view of the cartridge of FIG. 5.

FIG. 7 is a longitudinal cross-sectional view and jacket of FIG. 5 showing the thermometer or probe inserted in the cartridge with the tip of the thermometer or probe at the free inside end of the elastic jacket.

FIG. 8 is a longitudinal cross-sectional view of the cartridge and jacket of FIG. 5 showing the thermometer or probe fully inserted through the cartridge with the jacketed probe projecting and ready for use.

DESCRIPTION OF THE PREFERRED EMBODIMENTS

Referring now to FIG. 1, one embodiment of the disposable prophylactic 9 of the invention includes a very thin, rolled-up jacket 10 of rubber or equivalent elastomeric material and tubular housing 12 preferably of plastic. The housing 12 supports a tubular elastomeric of soft rubber liner 13 having tapered wall portions 11. The housing is sealed off at its ends by two thin membrane seals 14, 15 of a paper, foil or plastic film material which accommodates gas or radiation sterilization.

As shown, an annular plastic stopper cap 16, having an opening 17, maintains the liner 13 against a housing forward wall 18 and sandwiches the membrane 15. The membrane 14 is sandwiched at the other end, as shown. When assembled, the unit 9 may be gas or radiation sterilized by conventional techniques, thereby rendering the jacket 10 sterile.

Referring to FIG. 3, a thermometer or probe may be inserted through the seal 15 at the rearward end of the cartridge 12. This breaks the seal 15, displaces the jacket forwardly, and starts it unrolling onto the probe P. As shown in FIG. 3, the rolled portion of the jacket 10 (in the form of an O-ring) depresses the soft rubber liner 13, which provides sufficient frictional engagement with the jacket to cause it to automatically unroll, which accommodates the insertion of varying sizes and shapes of thermometers and probes. The liner 13 also compensates for diminution in diameter of the O-ring-like rolled portion of the jacket 10 as the jacket progressively unrolls with the progressive insertion of the probe P.

Referring to FIG. 4, the thermometer or probe P is shown fully advanced through the cartridge 12. The forward seal 15 is broken by the advance of the jacketed tip of the probe, as will be understood. The remaining rolled portion of the jacket 10 rests at the forward end of the housing 12 against wall 18 and the sterile, jacketed probe is fully extended sufficiently therebeyond for conventional use of the probe.

Referring now to FIG. 5, an alternate embodiment of the invention includes a very thin elastomeric or rubber jacket 30 and a plastic housing or cartridge 31 therefor. The neck 32 of the rubber jacket 30 is stretched and looped over the end 33 of the housing. Two thin seals 34, 35 close off the plastic housing. A semi-rigid plastic cap 36 with a small opening 37 in the center of the thinned down center portion is placed over the housing end 33, as shown. The plastic cap clamps the rubber jacket 30 securely to the housing and may be permanently bonded to the housing walls. The membrane seal material permits either gas or radiation sterilization of the finished assembly.

Referring to FIG. 7, the thermometer or probe P is shown inserted into the cartridge as far as the closed, forward end of the rubber jacket 30. The seal 34 is broken by this action. The cap wall 38 adjacent the opening 37 deflects inwardly and provides a friction grip of the probe P, in accordance with the invention.

Referring to FIG. 8, the thermometer or probe P is illustrated in its operative condition extending through the cartridge 31. The forward seal 35 is broken by passage of the jacketed tip of the probe therethrough. The elastic rubber jacket 30 is stretched to approximately three times its original length and tightly sheaths the probe which projects sufficiently beyond the cartridge front wall 39, for use, e.g., oral or rectal temperature taking. Importantly, the friction locking of the semi-rigid plastic cap prohibits the elastic force of the rubber jacket to expel the probe P from the cartridge.

After removal of the thermometer or probe from the patient by using the cartridge 31, the cartridge 31 is simply pulled off the thermometer or probe and discarded. Removal of the cartridge, reverses the process described above, and automatically retracts the jacket 30, returning the contaminated jacket completely inside the cartridge. The thermometer or probe remains clean at all times.

Conventionally, with electric/electronic thermometers, the temperature of the patient is noted prior to the removal of the probe, whereas with clinical glass fever thermometers the temperature is read after removal, since these thermometers retain their readings. In the latter case, the cartridge described in this invention would be removed and discarded before noting the temperature readings.

It will be appreciated that, heretofore, when nurses or doctors used a clinical glass fever thermometer, readings were made after removal from patients and prior to re-sterilization. This required the handling of an unsterile instrument and created problems of spreading germs, contamination, and reinfection. The present invention obviates these problems.

Recently, for convenience and to reduce handling and breakage, certain regularly used hospital instruments, such a those used for taking blood pressure, have been redesigned to be wall mounted, usually one unit between two beds, with large, easy to read indicators. The idea of having a wall mounted thermometer (which may be electric/electronic or any other means of remote display on a large easy to read indicator) has not been practical because of the expensive disposable sensing probes. The present invention now makes the use of wall mounted electric thermometers practical, as will be appreciated.

It should be particularly understood that the specific forms of the new and improved prophylactic device representing the present invention herein illustrated and described are intended to be representative only, as many variations may be made therein without departing from the clear teachings of the disclosure. By way of example only, the elements of the new prophylactic device may be formed of any suitable material, such as plastics, foils, paper laminates, and the like for the housing; natural rubber, synthetic rubber, stretchable plastics and the like for the jacket or sheath; and papers, foils, plastic films and the like for the end seals. Moreover, the sheath material may be chosen to be transparent when extended to permit thermometer readings to be made before jacket removal.

Accordingly, reference should be made to the following appended claims in determining the full scope of the invention.

I claim:

1. A prophylactic assembly for a longitudinal internal body probe such as a thermometer, said assembly comprising
   a. a tubular cartridge member open at both ends;
   b. a thin elastomeric tubular sheath means having an extended, relaxed length less than the length of said cartridge member retractably disposed within said cartridge and adapted to conform closely to the shape of the forward end of said probe and to be extensible forwardly and outwardly of said cartridge;
   c. membrane means closing off said open ends;
   d. said membrane means being readily rupturable by said probe and being permeable to gas or radiation sterilizing media;
   e. means non-removably retaining said sheath within said cartridge.

2. The prophylactic assembly of claim 1, further including
   a. means associated with said cartridge for frictionally gripping a probe against the spring forces of said elastomeric sheath in a stretched condition.
3. The prophylactic assembly of claim 1, in which
   a. said sheath is initially rolled up and anchored at the rearward end of said cartridge;
   b. said cartridge includes an elastomeric liner means.
4. The prophylactic assembly of claim 1, in which
   a. said sheath is anchored in said cartridge in an relaxed condition;
   b. said sheath has a diameter substantially greater than said probe;
   c. said cartridge has a length substantially less than said probe;
   d. said sheath is longitudinally extensible for a distance equal to at least several times its relaxed length;
   e. said sheath is of sufficient elasticity to retract automatically said sheath into said cartridge when stressing extension forces are removed therefrom;
   f. locking means associated with said cartridge to join temporarily said cartridge with said probe; and
   g. said locking means being of sufficient strength to resist the force of an extended sheath.
5. The prophylactic assembly of claim, 4 in which
   a. said cartridge includes an end cap;
   b. said cap clamps the open end of said sheath to the rearmost cartridge wall portions.
6. The prophylactic assembly of claim 1, in which
   a. said sheath is substantially transparent when extended.
7. The prophylactic assembly of claim 1, in which
   a. said cartridge is a paperboard tube.
8. The prophylactic assembly of claim 1, in which
   a. said cartridge is a plastic tube.

* * * * *